FIG. 2

May 2, 1967 H. A. BING ETAL 3,316,824
APPARATUS FOR WITHDRAWING FILM UNITS FROM A FILM PACK
Filed Oct. 21, 1965 5 Sheets-Sheet 3

FIG. 3

INVENTORS
HERBERT A. BING
WILLIAM L. HANNA
DAVID S. WILSON
BY
BROWN & MIKULKA
ATTORNEYS 3,316,824
APPARATUS FOR WITHDRAWING FILM UNITS FROM A FILM PACK
Herbert A. Bing, Wellesley, William L. Hanna, Foxboro, and David S. Wilson, Rockland, Mass., assignors to Polaroid Corporation, Cambridge, Mass., a corporation of Delaware
Filed Oct. 21, 1965, Ser. No. 499,552
14 Claims. (Cl. 95—1)

This invention relates to apparatus utilized in conjunction with a camera of the type which accommodates a film pack, and more particularly to apparatus for assisting in the withdrawal of film units from the film pack.

Patents Nos. 3,079,849 and 3,161,516, both assigned to the assignee of the present invention, illustrate a type of film pack with which this invention may be used, a film pack commercially designated as Types 107 and 108 from the manufacturer, Polaroid Corporation of Cambridge, Mass. Application Ser. No. 268,999, filed Mar. 29, 1963 now Patent No. 3,165,040, also assigned to the assignee of the present invention, describes a camera back designed to accommodate this type of film pack. Such a film pack encloses an assemblage of film units, each of which comprises a photosensitive sheet, a print-receiving sheet, and a breakable pod containing processing fluid. To each film unit is attached a leader projecting from the film pack and camera back into access of the user of the camera. After the photosensitive sheet is exposed, the leader attached to that unit is withdrawn from the film pack and severed from the film unit. This operation superposes the photosensitive sheet upon the print-receiving sheet, and, in addition, causes the leading end of the film unit to project from the film pack for access by the user. The leading end is then grasped and the film unit is withdrawn from the film pack. During this withdrawal of the film unit, pressure-applying members within the camera back act upon opposed sides of the film unit, breaking the pod and causing the processing fluid to be distributed between the photosensitive and print-receiving sheets.

This two-step operation of first pulling the leader from the film pack with the fingers, and then withdrawing the film unit by grasping and pulling the leading end of the unit is quite satisfactory for normal consumer use. However, it has been found that when a camera back accommodating such a film pack is incorporated, for example, in apparatus for use in making identification photographs where hundreds or perhaps thousands of photographs may be taken in relatively rapid succession, this unaided hand operation becomes excessively time consuming and laborious.

Accordingly, it is an object of this invention to provide apparatus for assisting in the withdrawal of film units from a film pack which makes possible a very rapid and facile withdrawal of the film units.

It is another object of this invention to provide apparatus for assisting in the withdrawal of film units from a film pack which minimizes the possibility of the film units jamming during removal from the film pack.

Briefly, one form of the apparatus which constitutes the present invention comprises a two-carriage assembly mounted to reciprocate to and from a camera back carrying a film pack. The assembly includes a primary carriage having clamping means thereon for retentively engaging the leading end of a film unit projecting from the film pack. A secondary carriage on the primary carriage is mounted to reciprocate to and from the primary carriage and includes clamping means for retentively engaging the leader of a film unit. In operation, as the assembly is moved into contiguity with the camera back, the clamping means on the secondary carriage, which has been cocked by a previous operation, is tripped into retentive engagement with a leader projecting from the film pack through a slot in the camera back. As the withdrawal stroke of the carriages is initiated, only the secondary carriage moves at first, causing the leader to be withdrawn from the film pack and several from the film unit. By means of a lost motion arrangement at the limit of the stroke of the secondary carriage with respect to the primary carriage, the primary carriage is engaged by means traveling with the secondary carriage and is "picked up." The clamping means on the primary carriage retentively engages the leading end of the film unit from which the leader has been severed. As the stroke is continued, the primary carriage is displaced sufficiently to completely withdraw the film unit from the film pack and the camera back. At the extreme end of the withdrawal stroke, release means automatically cause the leader and the film unit to be dropped from the respective clamping means.

Other objects of the invention will in part be obvious and will in part appear hereinafter.

The invention accordingly comprises the apparatus possessing the construction, combination of elements and arrangement of parts which are exemplified in the following detailed disclosure, and the scope of the application, of which will be indicated in the claims.

For a fuller understanding of the nature and objects of the invention, reference should be had to the following detailed description taken in connection with the accompanying drawings wherein.

The present invention is most suitably adapted for use with a film pack of the type described above enclosing an assemblage of film units, each film unit including a photosensitive sheet, a print-receiving sheet, and a breakable pod between the sheets which contains a processing fluid. Each film unit has a leader attached thereto which is withdrawn from the film pack after exposure of the photosensitive sheet to bring the print-receiving sheet into superposition with the photosensitive sheet. Withdrawal of the leader also causes the leading end of the film unit to pass between a pair of pressure-applying members mounted within the camera back and at one end thereof, and to project from the film pack and camera back into an accessible position. The processing operation in the film unit is initiated by grasping the leading end of the film unit and pulling the film unit through the pressure-applying members. This causes the pod to break and the processing fluid to be distributed between the photosensitive and print-receiving sheets.

Before undertaking a detailed description of the delineated embodiment of the invention, a brief overall description of the salient structural and operational aspects of the invention will be given.

Figure 1:
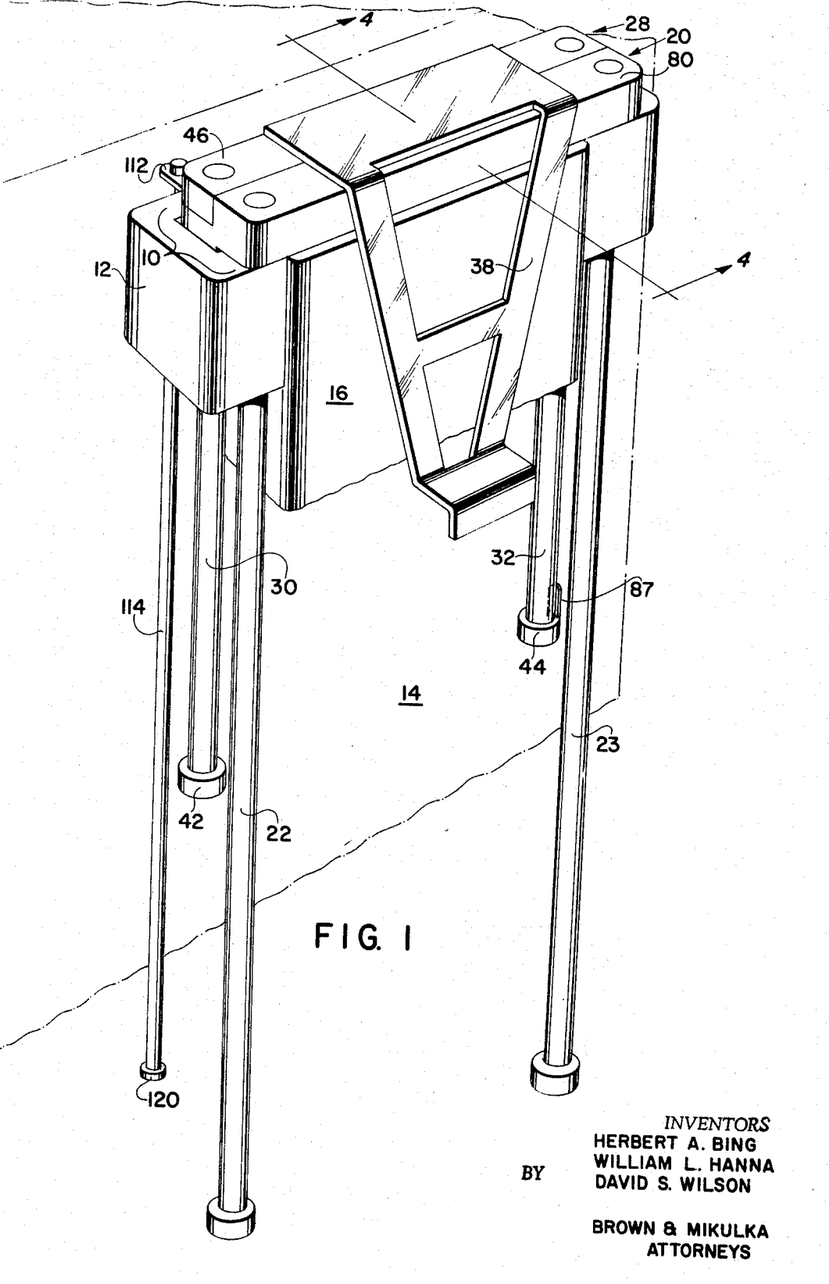
FIGURE 1 is a perspective view of apparatus embodying the invention, showing both the primary and secondary carriages positioned in contiguity with a camera back.
Figure 2:
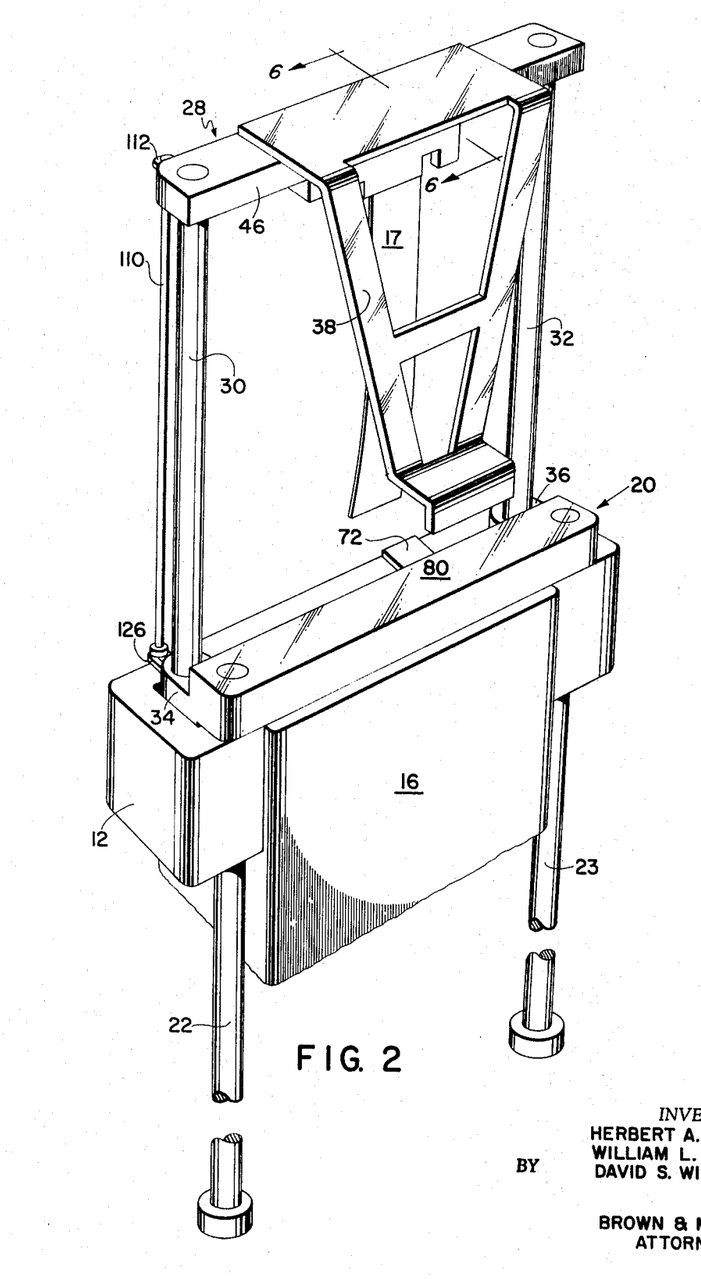
FIGURE 2 is another perspective view of apparatus embodying the invention, but showing the secondary carriage displaced from the primary carriage and the leader withdrawn from the film pack.
Figure 3:
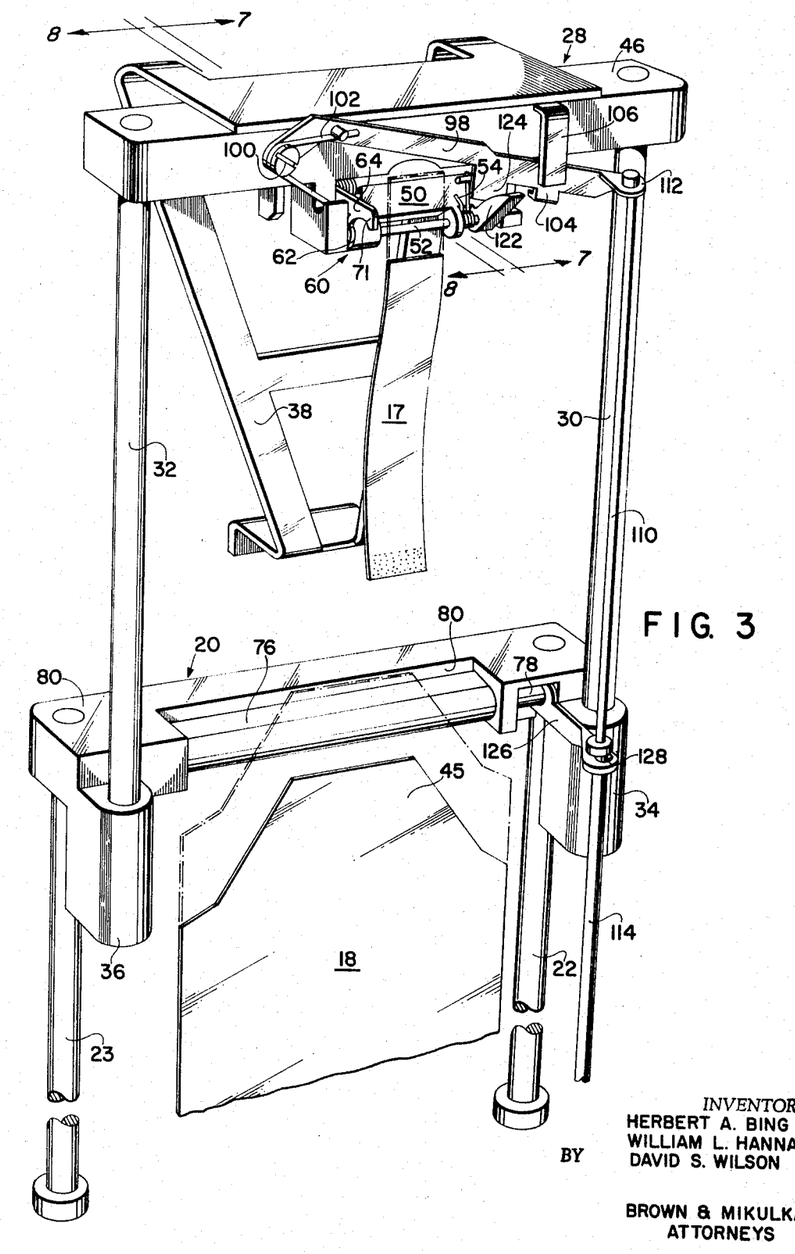
FIGURE 3 is still another perspective view of apparatus embodying the invention, showing both the secondary and primary carriages positioned at their respective limits of travel away from the camera back, and illustrating the leader and the film unit as they would appear immediately after having been released from clamping means on each of the primary and secondary carriages.

Referring to the drawings and particularly to the perspective views in FIGS. 1-3, it will be seen that this embodiment of the invention contemplates a two-carriage assembly 10. A mounting brace 12 attached to a camera 14 (shown only in phantom lines in FIGURE 1) supports the two-carriage assembly 10 adjacent a camera back 16 containing a film pack (not shown). In operation, a single stroke of the carriages comprising the assembly 10 is effective to withdraw a leader 17 of a film unit 18 and the film unit 18 itself from the film pack in the camera back 16.

The assembly 10 includes a primary carriage 20 mounted to reciprocate to and from the camera back 16 by means of parallel guide rods 22, 23 received in cylindrical apertures in mounting brace 12. A secondary carriage 28 is slideably mounted on the primary carriage 29 by means of a second pair of parallel guide rods 30, 32 received in sleeves 34, 36 on the primary carriage 20.

To start a withdrawal stroke, the carriage assembly 10 is first moved into contiguity with the camera back 16 by means of a handle 38 (see FIGURE 1). Clamping means on the secondary carriage 28, which has been cocked at the end of a previous withdrawal stroke, is automatically tripped into retentive engagement with the projecting leader 17 of the exposed film unit 18. Manual movement of the secondary carriage 28 by means of handle 38 to its limit of travel with respect to the primary carriage 20, as shown in FIG. 2, is effective to withdraw the leader 17 from the film pack and camera back 16 and to sever the leader 17 from the exposed film unit 18. Withdrawal of the leader 17 causes the leading end 45 of the film unit 18 to which the leader 17 is attached to project from the camera back 16 into the jaws of clamping means on the primary carriage 20. As the stroke is continued away from the camera back 16, flange members 42, 44 on guide rods 30, 32, respectively, engage and "pick up" the primary carriage 20, causing the clamping means on the primary carriage 20 to retentively engage the leading end 45 of the film unit 18. Continuing the stroke to its extreme away from the camera back 16 is effective to completely withdraw the film unit 18 from the camera back 16 and the film pack. At the end of the stroke, releasing means are provided to automatically free the leader 17 and the film unit 18 from the grip of the respective clamping means on the secondary carriage 28 and primary carriage 20. It is manifest from this brief description alone that this invention provides means with which film units may be quickly and easily withdrawn from a film pack.

A detailed description of the inventive concept and the structure and operation of the preferred embodiment of the invention will now be given. Referring now more closely to the drawings, it will be seen that the secondary carriage 28 includes a carriage body 46 having an anvil portion 48 thereon. Clamping means are provided on the secondary carriage 28 for retentively engaging a leader projecting from a film pack through the camera back 16. The clamping means comprises a clamping plate 50 rotatably mounted upon a pivot rod 52. The clamping plate 50 is biased toward the anvil portion 48 of the carriage body 46 by means of a torsion spring 54, shown in FIG. 3. A rubber insert 55 in the radially outermost edge 56 of plate 50 improves the frictional engagement of plate 50 with a leader 17 when the leader 17 is clamped between the plate 50 and the anvil portion 48, as illustrated in FIG. 4.

Figure 4:
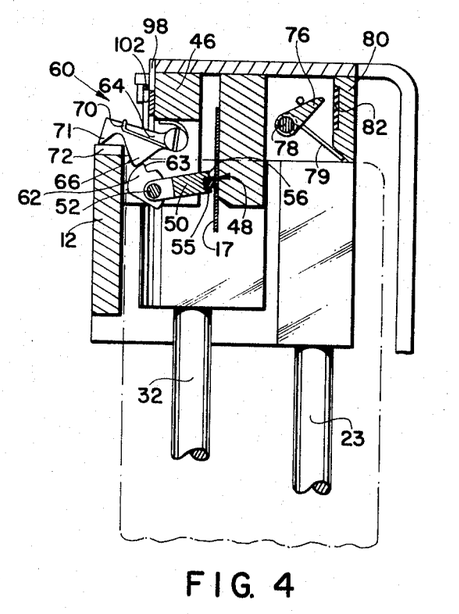
FIGURE 4 is a fragmentary sectional view taken along lines 4—4 in FIGURE 1.
Figure 8:
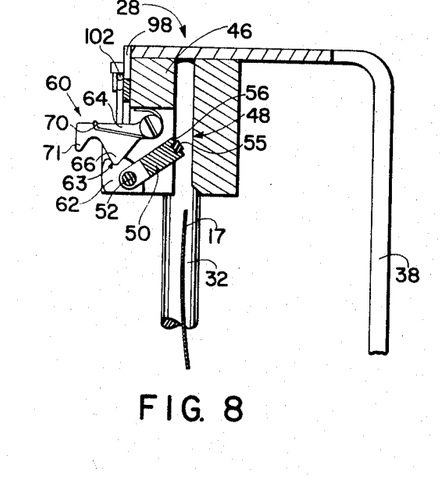
FIG. 8 is a fragmentary sectional view taken along lines 8—8 in FIG. 3.

In order that the leader 17 may enter between the clamping plate 50 and the anvil portion 48 as the secondary carriage is brought into contiguity with the camera back 16, cocking means 60 are provided (see especially FIGS. 4 and 8). The cocking means 60 includes a cam member 62, having a valley 63, the member 62 being connected to clamping plate 50 and rotatable therewith. The cocking means 60 also includes a trigger 64 having a tooth 66 which is received in the valley 63 in member 62 to cock the clamping plate 50 in a position spaced from the anvil portion 48 of carriage body 46. Torsional bias on the trigger 64 is provided by a torsion spring 70. The trigger 64 has an extension 71 which is displaced by a tripping plate 72 on mounting brace 12 when the secondary carriage 28 is brought into contiguity with the camera back 16. In FIG. 8 the clamping bar 50 is shown in its cocked position. In FIG. 4 the carriage assembly 10, including the secondary carriage 28, has been moved into contiguity with the camera back 16, causing tripping plate 72 to deflect extension 71 on trigger 64 and free the member 62. The clamping plate 50, under the influence of spring 54, clamps the leader 17 firmly against the anvil portion 48 of carriage body 46. It is thus evident that at the start of the withdrawal stroke, the clamping plate 50 has already been automatically tripped into engagement with the projecting leader 17.

Figures 5, 5A, 6, 9:
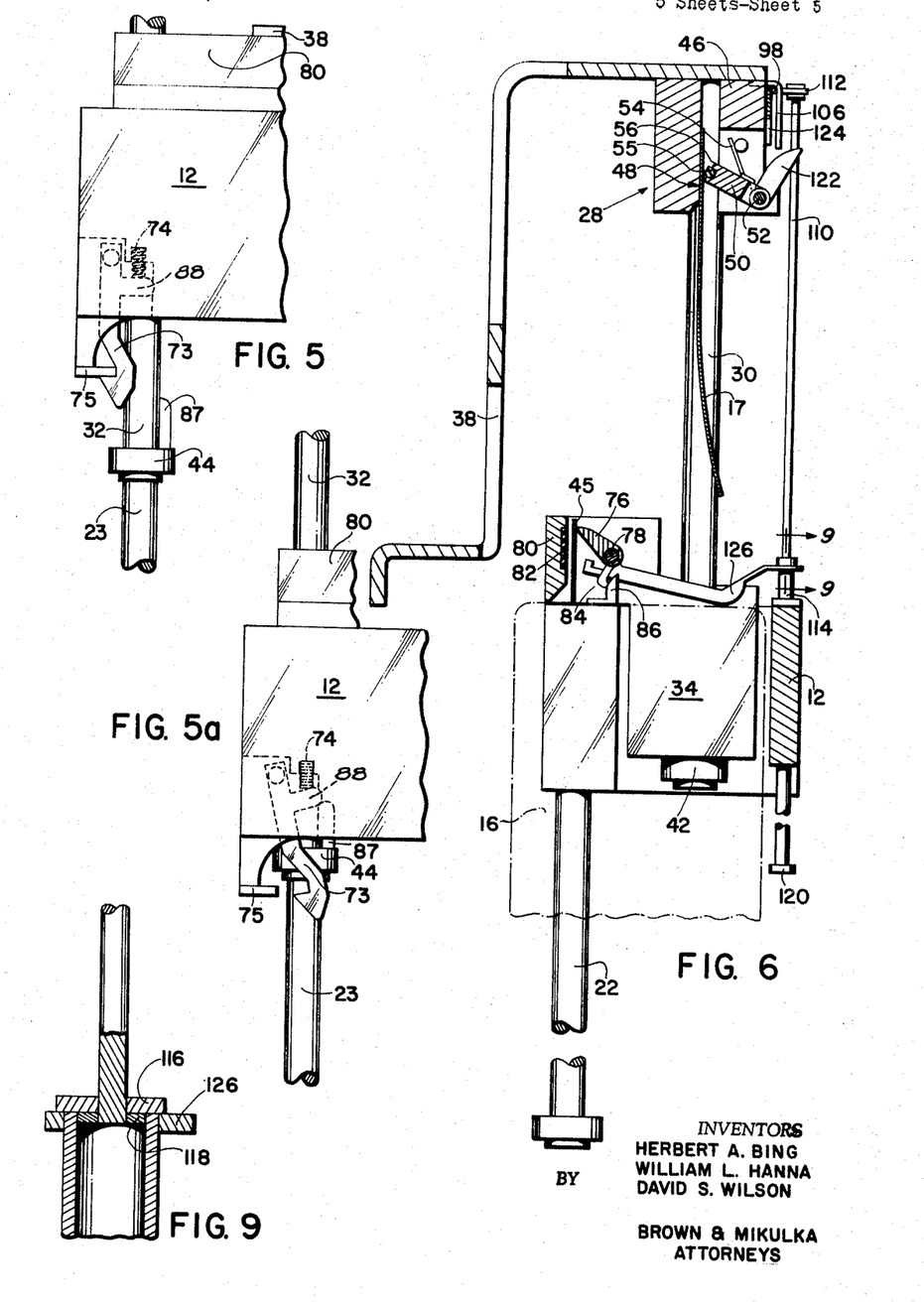
FIG. 5 shows an arrangement for latching the primary carriage to a brace for mounting the carriages, a latching member being shown in the latched position.
FIG. 5A is the same view as FIG. 5, but shows the latching member in an unlatched position.
FIG. 6 is a sectional view taken on lines 6—6 in FIG. 2.
FIG. 9 is an enlarged fragmentary sectional view taken along lines 9—9 in FIG. 6.
Figure 7:
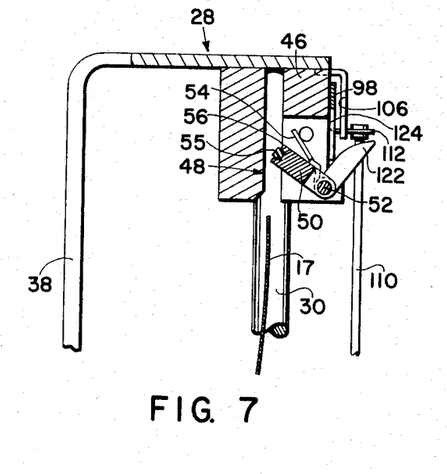
FIG. 7 is a fragmentary sectional view taken along lines 7—7 in FIG. 3.

With the leader 17 clamped between the clamping plate 50 and the anvil portion 48 of the carriage body 46, the upward withdrawal stroke is initiated by moving the handle 38 away from the camera back 16. The secondary carriage 28 moves away from the primary carriage 20 and the camera back 16, carrying the leader 17 with it. Near the limit of its travel with respect to the primary carriage 20, the leader 17 is fully withdrawn from the film pack and severed from the film unit to which it was attached. FIGS. 2 and 6 show the secondary carriage 28 displaced from the primary carriage 20 with the leader 17 clamped by the clamping plate 50.

In order that during this first portion of the withdrawal stroke during which the leader 17 is withdrawn from the film pack and camera back 16, the primary carriage 20 will not be dragged along with the secondary carriage 28 by any friction which might be present between the guide rods 30, 32 and sleeves 34, 36, latching means are provided (see FIGS. 5 and 5A). The latching means comprises a latch member 73 pivotally mounted upon the primary carriage 20; the latch member 73 is spring-biased in the clockwise direction (in FIGS. 5 and 5A) by means of a coil spring 74. Before the withdrawal stroke, as the carriage assembly 10 is lowered into contiguity with the camera back 16, the latch member 73 snaps into engagement with a catch projection 75 affixed to mounting brace 12, as shown in FIG. 5. Thus the primary carriage 20 cannot follow the secondary carriage 28 as the leader 17 is being withdrawn.

As stated above, withdrawal of the leader 17 causes the leading end 45 of the film unit 18 to project from the film pack. A slot (not shown) is provided in the top surface of the camera back 16 to allow the film unit 18 to pass from the camera back 16. FIG. 6 shows the leading end 45 of a film unit 18 projecting from the camera back 16 (shown only in phantom lines in this view) into film unit clamping means mounted on the primary carriage 20. The film unit clamping means includes a clamping bar 76 pivotally mounted on a pivot rod 78 and operated upon by a torsion spring 79. The primary carriage 20 has a frame 80, one portion of which frame 80 receives a flexible insert 82 against which the clamping bar 76 clamps. A radial arm 84 is connected to the clamping bar 76 and provides means by which the clamping bar 76 may be deflected away from the frame 80 when the primary carriage 20 is contiguous with the camera back 16. An elongated projection 86 extending from mounting brace 12 cooperates with the radial arm 84 to accomplish this deflection of the clamping bar 76. See FIG. 6.

To withdraw the film unit 18 from the film pack and camera back 16, it is necessary only to continue the withdrawal stroke to its limit away from the camera back 16. As this second portion of the withdrawal stroke, during which the film unit 18 is withdrawn from the film pack and camera back 16, is initiated, a number of events occur. First a trip finger 87 on flange 44 of guide rod 32 engages a transverse extension 88 on latch member 73, causing the latch member 73 to be rotated in a counterclockwise direction (in FIGS. 5 and 5A) to free the member 73 from engagement with catch projection 75. Second, the primary carriage 20 is engaged and "picked up" by flanges 42 and 44 on guide rods 30 and 32. And third, the radial arm 84 escapes from the rounded end of elongated projection 86, causing the clamping bar 76, under the counterclockwise bias of torsion spring 79, to clamp the leading end 45 of the film unit 18 against the flexible insert 82 on frame 80. Thus, after the leader 17 has been withdrawn and without interrupting the continuous movement of the secondary carriage away from the camera back 16, the latch member 73 is freed, the primary carriage 20 is "picked up" and the leading end 45 of the film unit 18 is clamped by the clamping bar 76.

Note that guide rods 30, 32 and flanges 42, 44 on guide rods 30, 32 comprise a lost motion arrangement with which a delay is interposed in the withdrawal stroke between the times when the secondary and primary carriages 28, 20 respectively move away from the camera back 16.

As the withdrawal stroke is continued, the primary carriage 20 is displaced from the camera back 16 and the film unit 18 is fully withdrawn from the film pack and camera back 16.

In order to provide for an expedient disposal of the leader 17 and a rapid and convenient utilization of the withdrawn film unit, releasing means are provided for automatically freeing the leader 17 and film unit 18 from the leader clamping means and the film unit clamping means, respectively.

Viewing especially FIGS. 3, 7, 8, and 9, the means for automatically releasing the leader 17 from its retentive engagement between the clamping plate 50 and the anvil portion 48 of carriage body 46 includes a release lever 98 pivotally mounted on carriage body 46 by means of screw 100 and angularly biased in the counterclockwise direction (in FIG. 3) by a torsion spring 102. An integral L-shaped transverse extension 104 on lever 98 acts as a stop to limit the angular displacement of the lever 98 in the counterclockwise direction. A guide arm 106 on carriage body 46 is provided to prevent any movement of the lever 98 in the axial direction.

The lever 98 is actuated by an actuator comprising a rod 110 connected at one end to an ear 112 on the release lever 98, and a tubular member 114 which receives the rod 110. Referring to FIG. 9 it will be seen that a cap 116 on the tubular member 114 receives rod 110 in an aperture therein. A radial spacer 118 connected to the rod 110 abuts with the cap 116 to prevent separation of the rod 110 and the tubular member 114.

As shown in FIGURE 1 the tubular member 114 has a flange 120 on the free end thereof, the flange 120 serving to prevent the tubular member 114 from passing through the mounting brace 12 at the extreme end of the withdrawal stroke.

In order that rotation of the release lever 98 will be effective to deflect clamping plate 50 away from the anvil portion 48 of carriage body 46, a cam 122 is provided. The cam 122 is affixed to mounting plate 50 and rotates therewith. A cam follower extension 124 on release lever 98 drives the cam 122 when the lever 98 is rotated in the clockwise direction (in FIG. 3), thus causing the clamping plate 50 to separate from the anvil portion 48 to free a leader 17 clamped by the clamping plate 50.

Means are also provided to automatically free the film unit 18 from its retentive engagement by the clamping bar 76 at the end of the withdrawal stroke. These means include a radial release arm 126, the arm 126 being pivotally mounted on pivot rod 78 and connected to the clamping bar 76.

The automatic release means operates as follows: very near the extreme end of the withdrawal stroke the actuator, including the rod 110 and tubular member 114, is completely extended, the spacer 118 being in engagement with cap 116 on tubular member 114 and the flange 120 on the tubular member 114 being in abutting engagement with the bottom surface of mounting brace 12. Slight additional displacement to the extreme end of the withdrawal stroke effects a clockwise rotation of the release lever 98. The cam follower extension 124 on release lever 98 drives the cam 122, causing the clamping plate 50 to be rotated out of engagement with the leader 17. The leader 17 drops free of the clamping plate 50.

While the above-described means are causing the leader 17 to be freed, the edge of an aperture 128 in radial release arm 126 engages the undersurface of cap 116, causing the radial release arm 126 to be pivoted downwardly and the clamping bar 76 to be opened. Thus, automatic release of both the leader 17 and the film unit 18 is effected automatically at the end of the withdrawal stroke.

For the succeeding withdrawal operation to be successful, the clamping plate 50 must be cocked before the secondary carriage 28 is brought into contiguity with the camera back 16. The cocking means provided to cock the clamping plate 50 have been described above. They include cam member 62, trigger 64, and spring 70. During the release operation, as the clamping bar 50 and cam member 62 are rotated by the lever 98 acting on cam 122, the tooth 66 on trigger 64 snaps into valley 63 in the member 62. The clamping bar 50 is thus held in its cocked position by the engagement of the tooth 66 in the valley 63. It is manifest, therefore, that the actuation of the release lever 98 is effective not only to free the leader 17, but also accomplishes a cocking of the clamping plate 50 in preparation for a succeeding withdrawal stroke.

It is evident then that with this novel apparatus, both the leader of a film unit and the film unit itself can be fully withdrawn from a film pack with one smooth and continuous stroke of the carriages away from the film pack. In addition, the apparatus provides means for automatically releasing the leader and the film unit from the apparatus at the end of the withdrawal stroke, and additional means for automatically recocking the leader clamping means in preparation for a succeeding withdrawal stroke. With this apparatus, because of the straight line movement of the carriages directly away from the film pack and the smoothness of the withdrawal operation, the possibility of a film unit jamming in the film pack or in the withdrawal apparatus is minimized.

Structural implementations other than that described above are within the purview of this invention. For example, both the primary and secondary carriages might be mounted on the same pair of guide members or on a single guide member. Modifications of the described apparatus for mounting the carriages and for accomplishing the clamping, releasing, and other functions are foreseeable and within the capabilities of one skilled in the art.

Since certain other changes may also be made in the above apparatus without departing from the scope of the invention herein involved, it is intended that all matter contained in the above-description and shown in the accompanying drawings shall be interpreted as illustrative and not in a limiting sense.

What is claimed is:
1. Apparatus for assisting in the successive withdrawal of film units from a film pack of the type enclosing an assemblage of film units, each unit having a leader which is withdrawn from the film pack to cause the leading end of the film unit to project from the film pack, comprising in combination:

first means mounted for movement away from a film pack for engaging and withdrawing said leader from said film pack;

second means mounted for movement away from said film pack for engaging and withdrawing said film unit from said film pack; and lost motion means coupling said first and second means for introducing a delay between the movements of said second and first means away from the film pack, whereby during a single withdrawal stroke of said first and second means away from a film pack, the leader of a film unit is retentively engaged by said first means and withdrawn from the film pack, and thereafter, the film unit is retentively engaged by said second means and withdrawn from the film pack.

2. Apparatus for assisting in the successive withdrawal of film units from a film pack of the type enclosing an assemblage of film units, each unit having a leader thereon which is withdrawn from the film pack to cause the leading end of the film unit to project from the pack into access of the user, comprising, in combination:

a first carriage;

means mounting said first carriage for movement away from a film pack from a position contiguous with the film pack;

film unit clamping means on said first carriage for retentively engaging a portion of a film unit projecting from the film pack;

a second carriage;

means mounting said second carriage for movement relative to said first carriage and to the film pack;

leader clamping means on said second carriage for retentively engaging the leader of a film unit; and lost motion means coupling said first and second carriages for introducing a delay between the movements of said second and first carriages away from the film pack, whereby during a single withdrawal stroke of said carriages away from a film pack, the leader of a film unit is retentively engaged by said leader clamping means and withdrawn from the film pack, and, thereafter, the film unit is retentively engaged by said film unit clamping means and withdrawn from the film pack.

3. The apparatus defined in claim 2 wherein said second carriage is carried on said first carriage, said mounting means mounting said second carriage including a part of said first carriage.

4. The apparatus defined in claim 2 including releasing means effective at the end of said stroke to automatically release said film unit from said film unit clamping means and said leader from said leader clamping means.

5. Apparatus for assisting in the successive withdrawal of film units from a film pack of the type enclosing an assemblage of film units, each unit having a leader thereon which is withdrawn from the film pack to cause the leading end of the film unit to project from the pack into access of the user, comprising, in combination:

a first carriage;

means mounting said first carriage for movement to and from a film pack;

film unit clamping means on said first carriage for retentively engaging a portion of a film unit projecting from the film pack;

first cocking means for opening and retaining open said film unit clamping means when said first carriage is contiguous with a film pack to allow entry of a portion of a film unit therein;

a second carriage;

means mounting said second carriage for movement relative to said first carriage and to the film pack;

leader clamping means on said second carriage for retentively engaging the leader of a film unit;

second cocking means for opening and retaining open said leader clamping means to allow entry of a leader therein;

tripping means mounted adjacent the film pack for tripping said second cocking means to release said leader clamping means upon a leader when said second carriage is moved into contiguity with the film pack; and lost motion means coupling said first and second carriages for introducing a delay between the movements of said second and first carriages away from the film pack, whereby during a single withdrawal stroke of said carriages away from a film pack, the leader of a film unit is retentively engaged by said leader clamping means and withdrawn from the film pack, and, thereafter, the film unit is retentively engaged by said film unit clamping means and withdrawn from the film pack.

6. Apparatus for assisting in the successive withdrawal of film units from a film pack of the type enclosing an assemblage of film units, each unit having a leader thereon which is withdrawn from the film pack to cause the leading end of the film unit to project from the pack into access of the user, comprising, in combination:

a first carriage including a frame;

means mounting said first carriage for movement away from a film pack from a position contiguous with the film pack;

film unit clamping means on said first carriage, said clamping means including a rotatably mounted, spring-biased clamping bar for successively receiving and then retentively clamping a portion of a film unit projecting from the film pack against said frame;

a second carriage including an anvil portion;

means mounting said second carriage for movement relative to said first carriage and to the film pack;

leader clamping means on said second carriage, said leader clamping means including a rotatably mounted, spring-biased clamping plate for successively receiving and then retentively clamping the leader of a film unit against said anvil portion of said second carriage; and lost motion means coupling said first and second carriages for introducing a delay between the movements of said second and first carriages away from the film pack, whereby during a single withdrawal stroke of said carriages away from a film pack, the leader of a film unit is retentively engaged by said leader clamping means and withdrawn from the film pack, and, thereafter, the film unit is retentively engaged by said film unit clamping means and withdrawn from the film pack.

7. The apparatus defined in claim 6 including releasing means for automatically releasing a clamped film unit from said clamping bar and a clamped leader from said clamping plate, said releasing means comprising:

a radial arm on said clamping bar, a cam on said clamping plate, a lever pivotally mounted on said second carriage for engaging said cam to deflect said clamping plate, and an actuator interconnecting said arm and said lever, whereby at the end of said withdrawal stroke said actuator angularly displaces said arm and said lever to deflect open said clamping plate and said clamping bar.

8. The apparatus defined in claim 7 including cocking means for automatically cocking said clamping plate at the end of said withdrawal stroke in preparation for a succeeding stroke, comprising:

a cam member on said clamping plate having a valley therein, a trigger on said second carriage having a tooth thereon, said trigger being spring-biased into engagement with said cam member, whereby as said lever is actuated to deflect said clamping plate, said cam member rotates and said tooth on said trigger snaps into said valley, cocking said clamping plate in an open position.

9. Apparatus for assisting in the successive withdrawal of film units from a film pack of the type enclosing an assemblage of film units, each unit having a leader thereon which is withdrawn from the film pack to cause the leading end of the film unit to project from the pack into access of the user, comprising, in combination:
 a primary carriage;
 means mounting said primary carriage for reciprocatory movement to and from a film pack, said means comprising:
  a mounting brace defining a pair of parallel cylindrical openings therein, and
  a pair of parallel guide members on said primary carriage, said members being slideably received in said openings;
 film unit clamping means on said primary carriage for successively receiving and then retentively engaging the leading end of a film unit projecting from the film pack;
 a secondary carriage;
 mounting means on said primary carriage mounting said secondary carriage for reciprocatory movement to and from said primary carriage, said mounting means comprising:
  a pair of parallel sleeves on said primary carriage, and
  a pair of parallel guide rods on said secondary carriage, said guide rods being received in said sleeves; and
 lost motion means coupling said primary and secondary carriages for introducing a delay between the movements of said secondary and primary carriages away from the film pack, said lost motion means comprising said guide members and flange members on the free ends of said guide members which engage said primary carriage at the limit of travel of said secondary carriage with respect to said primary carriage;
 leader clamping means on said secondary carriage for successively receiving and then retentively engaging the leader of a film unit, whereby during a single withdrawal stroke said secondary carriage is moved away from said primary carriage and the film pack, causing the leader of a film unit, retentively engaged by said leader clamping means, to be withdrawn from the film pack, and whereby as said withdrawal stroke is continued said flange members engage said primary carriage and said film unit is retentively engaged by said film unit clamping means and withdrawn from the film pack.

10. The apparatus defined in claim 9 including latching means comprising:
 a pivoted, spring-biased latch member on said primary carriage,
 a catch projection on said mounting brace, and
 a trip finger on one of said guide rods, said latch member engaging said catch projection to prevent separation of said primary carriage from a film pack during the portion of said withdrawal stroke in which a leader is withdrawn from the film pack, said trip finger disengaging said latch member from said catch projection to free said primary carriage at the end of said portion of said withdrawal stroke.

11. Apparatus for assisting in the successive withdrawal of film units from a film pack of the type enclosing an assemblage of film units, each unit having a leader thereon which is withdrawn from the film pack to cause the leading end of the film unit to project from the pack into access of the user, comprising, in combination:
 a primary carriage including a frame;
 means mounting said primary carriage for reciprocatory movement to and from a film pack, said means comprising:
  a mounting brace defining a pair of parallel cylindrical openings therein, and
  a pair of parallel guide members on said primary carriage, said members being slideably received in said openings;
 film unit clamping means on said primary carriage, said clamping means including a rotatably mounted, spring-biased clamping bar for successively receiving and then retentively clamping the leading end of a film unit projecting from the film pack against said frame;
 a secondary carriage including an anvil portion;
 mounting means on said primary carriage mounting said secondary carriage for reciprocatory movement to and from said primary carriage, said mounting means comprising:
  a pair of parallel sleeves on said primary carriage, and
  a pair of parallel guide rods on said secondary carriage, said guide rods being received in said sleeves;
 lost motion means coupling said primary and secondary carriages for introducing a delay between the movements of said secondary and primary carriages away from the film pack, said lost motion means comprising said guide members and flange members on the free ends of said guide members which engage said primary carriage at the limit of travel of said secondary carriage with respect to said primary carriage; and
 leader clamping means on said secondary carriage, said leader and clamping means including a rotatably mounted, spring-biased clamping plate for successively receiving and then retentively clamping a leader of a film unit against said anvil portion of said secondary carriage, whereby during a single withdrawal stroke said secondary carriage is moved away from said primary carriage and the film pack, causing the leader of a film unit, retentively engaged by said leader clamping means, to be withdrawn from the film pack, and whereby as said withdrawal stroke is continued said flange members engage said primary carriage and said film unit is retentively engaged by said film unit clamping means and withdrawn from the film pack.

12. The apparatus defined in claim 11 including releasing means for automatically releasing a clamped film unit from said clamping bar and a clamped leader from said clamping plate, said releasing means comprising:
 a radial arm on said clamping bar,
 a cam on said clamping plate,
 a spring-biased lever pivotally mounted on said secondary carriage for engaging said cam to deflect said clamping plate, and
 an actuator inter-connecting said arm and said lever, whereby at the end of said withdrawal stroke said actuator angularly displaces said arm and said lever to deflect open said clamping plate and said clamping bar.

13. The apparatus defined in claim 12 including cocking means for automatically cocking said clamping plate at the end of said withdrawal stroke in preparation for a succeeding stroke, comprising:
 a cam member on said clamping plate having a valley therein,
 a trigger on said second carriage having a tooth thereon, said trigger being spring-biased into engagement with said cam member, whereby as said lever is actuated to deflect said clamping plate, said cam member rotates and said tooth on said trigger snaps into said valley, cocking said clamping plate in an open position.

14. The apparatus defined in claim 13 including latching means comprising:
- a pivoted, spring-biased latch member on said primary carriage,
- a catch projection on said mounting brace, and
- a trip finger on one of said guide rods, said latch member engaging said catch projection to prevent separation of said primary carriage from a film pack during the portion of said withdrawal stroke in which a leader is withdrawn from the film pack, said trip finger disengaging said latch member from said catch projection to free said primary carriage at the end of said portion of said withdrawal stroke.

No references cited.

NORTON ANSHER, *Primary Examiner.*

R. M. SHEER, *Assistant Examiner.*